United States Patent [19]

Ackilli et al.

[11] Patent Number: 4,891,198

[45] Date of Patent: Jan. 2, 1990

[54] PREPARATION OF TRICALCIUM PHOSPHATE

[75] Inventors: Joseph A. Ackilli, So. Salem; Fouad Z. Saleeb, Pleasantville; Philip Morreale, Mt. Vernon, all of N.Y.; Randal P. McKay, Paramus, N.J.

[73] Assignee: General Foods Corporation, White Plains, N.Y.

[21] Appl. No.: 894,609

[22] Filed: Aug. 7, 1986

[51] Int. Cl.$^4$ .................... C01B 15/16; C01B 25/26
[52] U.S. Cl. .................................. 423/308; 423/311
[58] Field of Search ............................... 423/308, 311

[56] References Cited

U.S. PATENT DOCUMENTS

| | | | |
|---|---|---|---|
| 2,030,461 | 2/1936 | Moss | 423/311 |
| 3,361,665 | 1/1968 | Tesche et al. | 423/311 |
| 4,247,526 | 1/1981 | Jarvis et al. | 423/311 |
| 4,294,808 | 10/1981 | Wasel-Nielen et al. | 423/311 |

FOREIGN PATENT DOCUMENTS

| | | | |
|---|---|---|---|
| 962182 | 7/1964 | United Kingdom | 423/311 |
| 995096 | 6/1965 | United Kingdom | 423/311 |

*Primary Examiner*—Gregory A. Heller
*Attorney, Agent, or Firm*—Thomas R. Savoie; Daniel J. Donovan

[57] ABSTRACT

A process for the preparation of rapidly soluble DCP and TCP. The process comprises adding calcium to phosphoric acid, during continuous agitation, while regulating the pH and temperature. The resultant slurry is quickly dried. The TCP which is formed is rapidly soluble in an acidic aqueous solution, such as a dry beverage mix.

4 Claims, No Drawings

PREPARATION OF TRICALCIUM PHOSPHATE

TECHNICAL BACKGROUND

This invention relates to a novel process for the preparation of tricalcium phosphate (hereinafter referred to as TCP). Commercially available TCP has been unsatisfactory in the past, due to the tendency to agglomerate upon drying, and, when incorporated in powdered mixes, such as dry beverage mixes, to dissolve slowly and incompletely in the presence of food acids, such as citric acid, and produce turbidity and sediment in reconstituted beverages.

Calcium phosphates (mono, di, tri and hydroxyapatite) are widely used in everyday life. The fairly water insoluble TCP and hydroxyapatite are the major mineral constituents of bone and teeth in the Animal Kingdom. The solubility of calcium phosphates in water, decreases with the increase of the degree of neutralization of the phosphoric acid (e.g., monocalcium phosphate is the most soluble in water; hydroxyapatite is the least soluble in water). All the calcium phosphates are soluble in strong mineral acids, such as hydrochloric acid. However, when relatively weak food acids, such as citric acid, are used, the rate and degree of solublization of the calcium phosphates is greatly dependent upon their degree of neutralization. The very basic phosphate, calcium hydroxyapatite, is extremely slow to dissolve in citric acid, and a drink without sediment or turpidity is impossible to maintain.

The commercial process presently used for the production of TCP is well known, and involves the slow addition of phosphoric acid to a lime slurry at a temperature between 70° C. and 80° C. until the pH is nearly neutral, then filtering and drying the resultant wet cake, which has an overall solids composition corresponding to a $CaO:P_2O_5$ mole ratio of 3. The dried product is then milled in one of several ways to reduce the average particle size and render the TCP suitable for use.

It is believed that the incomplete solubilization of commercial TCP in acidic food solutions is due to the presence of the very insoluble, crystalline, basic tricalcium phosphate, also known as calcium hydroxyapatite (hereinafter referred to as hydroxyapatite).

It is generally recognized that crystals are formed in two stages: a nucleation stage (formation of the incipient crystal) and a 3-dimensional growth stage. The nucleation stage is believed to require a certain degree of supersaturation to overcome an "activation" energy in order to form a nucleus (a minimum grouping of ions that is capable of subsequent growth into a crystal). Following nucleation, crystal growth then proceeds as long as the solution is supersaturated with respect to that particular crystal composition. Crystal growth is a very complicated process that is governed by many factors. However, at a given set of conditions, the rate of crystallization is greatly accelerated as the number of nuclei present in solution is increased. Also, an increase in temperature results in an increase in the rate of crystal proliferation.

In U.S. Pat. No. 3,387,925, to Vanstrom et al., a method was disclosed which produced a TCP with a smaller particle size by controlling the reaction temperature and controlling the final pH. The process described therein favored the precipitation of a fine particle size TCP and obviated the need for drying and milling.

U.S. Pat. No. 4,324,772 to Conn et al., discloses a process for producing tricalcium phosphate/hydroxyapatite in large volumes. The process comprises continuously charging to the first stage of a two stage reactor, a slurry of calcium oxide in water and a solution of phosphoric acid in water. The lime slurry and phosphoric acid in water are allowed to react in the first stage under vigorous agitation at a pH such that the viscosity of the reaction mass is near minimum viscosity. The reaction is continued in the second stage of the reactor under vigorous agitation.

SUMMARY OF THE INVENTION

The present invention relates to a process for producing rapidly soluble TCP, while preventing the formation of hydroxyapatite. Hydroxyapatite, also called basic TCP, $(Ca_{10}(PO_4)_6(OH)_2)$ is the most stable, and least soluble form of TCP. In order to have rapidly soluble TCP, a less stable form is needed. A less stable form of TCP is formed by altering the order of addition of the reacting ingredients, and controlling processing parameters. Instead of adding the acid to the calcium base, the calcium base is rapidly added to the phosphoric acid, while controlling both the pH and the temperature of the reaction. In particular, the final pH must be kept elevated and the temperature must be kept below a specified maximum. In addition, the resultant slurry should be dried without excessive delay. By doing this, the formation of hydroxyapatite is kept to an absolute minimum, if not totally prevented.

It is believed that the commercial process presently used for the production of TCP promotes the conversion of a measurable fraction of the product into the very insoluble hydroxyapatite. The slow addition of phosphoric acid to a lime slurry is the ideal condition for producing aqueous systems that are fairly oversaturated with respect to hydroxyapatite. The relatively high temperature used (70° C.–80° C.) facilitates the reaction, and the extended reaction time (2–3 hours) at the high temperature, are optimal conditions for crystallization.

DETAILED DESCRIPTION

The process set forth in this invention deals with the production of rapidly soluble TCP. This is done by slowing down or eliminating the natural trend towards the formation of hydroxyapatite. The TCP produced according to this process, is readily wetable, and rapidly soluble in an acidic solution. The turbidity and sediment which result from the presently available commercial TCP, is eliminated. The resultant TCP product can be used in a number of foodstuffs, such as dried beverage and dessert mixes.

Hydroxyapatite is a well organized, thermodynamically stable and the least soluble crystalline form of calcium ortho phosphates. The prevention or minimization of this crystalline form results in a less stable, and therefore, more easily soluble form of TCP. The less stable forms of DCP and TCP are maintained by the instant methods of preparation, the drying conditions and additives that confuse the crystal structure. The amount of DCP (dicalcium phosphate) present in the final product is related to the amount of hydroxyapatite present. The formation of hydroxyapatite requires three TCP molecules plus an addition of calcium hydroxide $(Ca(OH)_2)$ Since the $Ca(OH)_2$ is needed to form the hydroxyapatite, one less molecule is available to form TCP, and a molecule of DCP results. The present invention provides a slurry with no more than 2% hydroxypapatite. This compares with the presently available TCP which contains approximately 10–15% hydroxyapatite.

The present process requires a reversal of the order of addition of ingredients. The usual procedure is to add the phosphoric acid to the calcium base. This results in the formation of hydroxyapatite, at least initially due to the presence of an excess of calcium. However, in the present invention, phosphoric acid is bombarded with calcium. The mixture is continuously agitated while a slurry of the calcium source is added, and forces the reaction to go from monocalcium phosphate to dicalcium phosphate and then to tricalcium phosphate. In addition, the reaction parameters or conditions which are imposed thereon prevent the precipitated calcium phosphate from continuing on to form hydroxyapatite. Therefore, the reaction ends when tricalcium phosphate is formed. The calcium source used herein can be calcium carbonate ($CaCO_3$), calcium oxide (CaO), or calcium hydroxide ($Ca(OH)_2$), the latter being the preferred form.

In order to prevent the formation of hydroxyapatite, both the temperature and the pH of the final slurry must be controlled. The pH must be kept elevated because a pH around neutral (~7) will favor the conversion of TCP to hydroxyapatite to occur. The pH preferred is within the range of 8–12, with a optimal pH of 11–12.

In addition the temperature must be kept low. There is the initial temperature of the components, the reaction temperature, and the temperature of the resultant slurry. The initial temperature of the two components should be kept quite low, from about 40° F. to about 80° F., preferably about 40° F. to about 50° F. When the calcium dispersion is added to the aqueous phosphoric acid, and the reaction begins, the temperature of the mixture increases, as the reaction is an exothermic one. The temperature of the mixture may be controlled while the reaction is taking place, or it may be left alone.

Once the desired reaction has been completed, if the temperature has not been controlled, the resultant slurry should be cooled down. The slurry may be brought to ambient temperature; it is not necessary to keep it below ambient. The temperature should be kept at or below 160° F. at all times, so as to prevent/minimize any recrystallization. The relatively high temperatures experienced during the reaction are for a brief time, and have not been found to affect the slurry.

Once the reacted slurry is formed, it has to be dried. Most conventional means of drying are acceptable, with freeze-drying and spray-drying the preferred methods. The slurry should be dried relatively quickly, but can remain at ambient temperatures for up to 24 hours without any detrimental effects.

Certain additives may be incorporated to assist in inhibiting the crystallization of DCP/TCP and its conversion to the more stable hydroxyapatite. Possible additives are magnesium phosphate and various food acids, other than phosphoric acid. The magnesium phosphate is co-precipitated by blending the calcium, such as $Ca(OH)_2$ with $Mg(OH)_2$ and adding it to an equivalent amount of phosphoric acid. The ratio of Mg to Ca would be from about 1:3 to about 1:10. Of the possible food acids, citric acid and malic acid are preferred for incorporation into the amorphous TCP. The added food acid should be from about 10% to about 30% of the molar concentration of phosphoric acid.

Use of the resultant TCP in a dry foodstuff, such as a powdered beverage mix, is a good source of calcium. A beverage mix comprising from about 1.08 grams of calcium to about 1.40 grams of calcium per quart of beverage, provides the same amount of calcium as found in an equal volume of milk. This is the same as from about 270 mg to about 310 mg of calcium per 8 oz glass of beverage.

The following examples are illustrative only, and not meant to be limiting in any manner.

EXAMPLE 1

3 moles of $Ca(OH)_2$ (222 g) were suspended in 800 ml of water and the resulting slurry added under continuous stirring to 2 moles of phosphoric acid (231 g of 85% phosphoric acid), which had been diluted in 1000 ml of water. The initial temperature of the diluted phosphoric acid was about 40° F. After mixing, ice was used to cool the reaction mixture, and the temperature was kept at about 60° F. The final pH of the resultant slurry was 11.5. A Niro spray tower equipped with rotary wheel atomizer was used to dry the resultant slurry (inlet temperature 150°–200° C., outlet temperature 60°–80° C., slurry feed rate 120 mls/min.).

EXAMPLE 2

Example 1 was repeated, but no temperature controls were allowed. On mixing the $Ca(OH)_2$ and the phosphoric acid, the suspension temperature reached 160° F. Half of the TCP suspension was spray dried within one hour of the preparation. The other half of the TCP was mixed for 3 hours at ambient temperatures and was then spray dried.

The results of Example 1 and the results of both parts of Example 2 were equal. A clear beverage was obtained when the TCP was dissolved upon stirring an aqueous solution containing citric acid. No turbidity or sediment were noted. Had any substantial amount of hydroxyapatite been present, e.g., more than 1%, the crystalline structure of the slurry would have changed during the 3 hours that it was mixed in Example 2. This would have resulted in a beverage which contained noticeable sediment. As a clear beverage was produced, there was very little, if any, hydroxyapatite resulted from the present process.

We claim:

1. A method for the preparation of tricalcium phosphate which is rapidly soluble in acidic food solutions comprising the steps of:
   (a) forming an aqueous suspension of calcium hydroxide;
   (b) rapidly adding said suspension to aqueous phosphoric acid, with continuous agitation, to form a reaction slurry having a pH of from 8 to 12, the phosphorus acid and the suspension each having an initial temperature of from about 40° F. to about 80° F.;
   (c) keeping the temperature of the slurry at or below 160° F. at all times, the reacted slurry containing no more than 2% hydroxyapatite; and
   (d) spray drying or freeze drying the reacted slurry.

2. The product produced by the process set forth in claim 1.

3. The process as set forth in claim 1 which further comprises the addition of magnesium phosphate, wherein the ratio of Mg:Ca is from 1:3 to 1:10.

4. The process as set forth in claim 1 which further comprises food acids, wherein the food acids are from about 10 to about 30% of the molar concentration of phosphoric acid.

* * * * *